(12) United States Patent
Find

(10) Patent No.: US 7,172,101 B2
(45) Date of Patent: Feb. 6, 2007

(54) POT USING MAGNETIC FORCE TO LINK A LID AND A BODY

(75) Inventor: Poul Erik Find, Sonderso (DK)

(73) Assignee: Free-Free Industrial Corp., Taipei (TW)

( * ) Notice: Subject to any disclaimer, the term of this patent is extended or adjusted under 35 U.S.C. 154(b) by 413 days.

(21) Appl. No.: 10/731,365

(22) Filed: Dec. 9, 2003

(65) Prior Publication Data

US 2005/0133545 A1  Jun. 23, 2005

(51) Int. Cl.
*B65D 51/00* (2006.01)
(52) U.S. Cl. ........................... 222/562; 220/230
(58) Field of Classification Search ............... 222/500, 222/562, 566–572; 220/230; 206/818
See application file for complete search history.

(56) References Cited

U.S. PATENT DOCUMENTS

| | | | | |
|---|---|---|---|---|
| 2,672,257 A | * | 3/1954 | Simmonds | 220/230 |
| 4,261,485 A | * | 4/1981 | Borg | 222/500 |
| 5,363,745 A | * | 11/1994 | Lin | 220/230 |
| 5,624,410 A | * | 4/1997 | Tsukada et al. | 220/230 |
| 5,996,831 A | * | 12/1999 | Teok | 220/230 |
| 6,336,567 B1 | * | 1/2002 | Hyobu | 220/230 |
| 6,382,450 B1 | * | 5/2002 | De Rosa et al. | 220/230 |

* cited by examiner

*Primary Examiner*—Eric Keasel
(74) *Attorney, Agent, or Firm*—Alan D. Kamrath; Nikolai & Mersereau, P.A.

(57) ABSTRACT

A pot includes a hollow body and a lid detachably mounted on the hollow body to cover the open end. There is at least one first magnet annularly embedded in the peripheral edge defining the open end of the hollow body. Two second magnets are diametrically embedded in a bottom face of the lid. When only one second magnet is attracted by the at least one first magnet, the lid is able to move relative to the hollow body to allow the lid to be inclined relative to the hollow body. When both second magnets are attracted by the at least one first magnet, the lid is retained relative to the hollow body so as to close the communication between the open end and the outlet.

9 Claims, 4 Drawing Sheets

POT USING MAGNETIC FORCE TO LINK A LID AND A BODY

BACKGROUND OF THE INVENTION

1. Field of the Invention

The present invention relates to a pot and, more particularly, to a pot having a lid and a hollow body with one open end to be closed by the lid. Both the lid and the body have magnets embedded in them such that the lid is attracted by the body even when the lid is inclined relative to the body.

2. Description of Related Art

A conventional pot has a hollow cylindrical body with one open end and a lid detachably connected to the body to cover the open end. The user is able to pour liquid into the hollow cylindrical body. When the liquid inside the pot is to be poured out of the body, the user needs to hold the lid while inclining the body to allow the liquid to flow out of the body. Otherwise, the lid will fall from the body. That is, the user needs to be very careful when the pot is used, which is quite troublesome.

In order to overcome the shortcoming, a different pot is introduced and has the lid screwed to the body. When the pot is used, the user unscrews the lid a little so that the liquid inside the body is able to flow out of the body. Thereafter, the user screws the lid back to the body to completely seal the open end. Continuously rotating the lid brings another drawback to the user, labor inefficiency.

To overcome the shortcomings, the present invention tends to provide an improved pot to mitigate the aforementioned problems.

SUMMARY OF THE INVENTION

The primary objective of the present invention is to provide an improved pot using magnets to link the lid to the body. When the pot is used, the user only needs to rotate the lid 180 degrees relative to the body to have the lid partially attracted by the body, and the outlet of the body is thus open and the liquid inside the body is able to flow out of the body; When the pot is not being used to pour, the user rotates the lid again for another 180 degrees to have the lid completely attracted by the body such that the outlet is closed, and the liquid is confined inside the body.

Another objective of the present invention is that there are first magnets annularly embedded in a peripheral edge defining the open end of the body and two second magnets diametrically embedded in the lid such that rotation of the lid relative to the body results in a complete attraction between the lid and the body in the first 180 degrees rotation and a partial attraction between the lid and the body in the second 180 degrees rotation.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
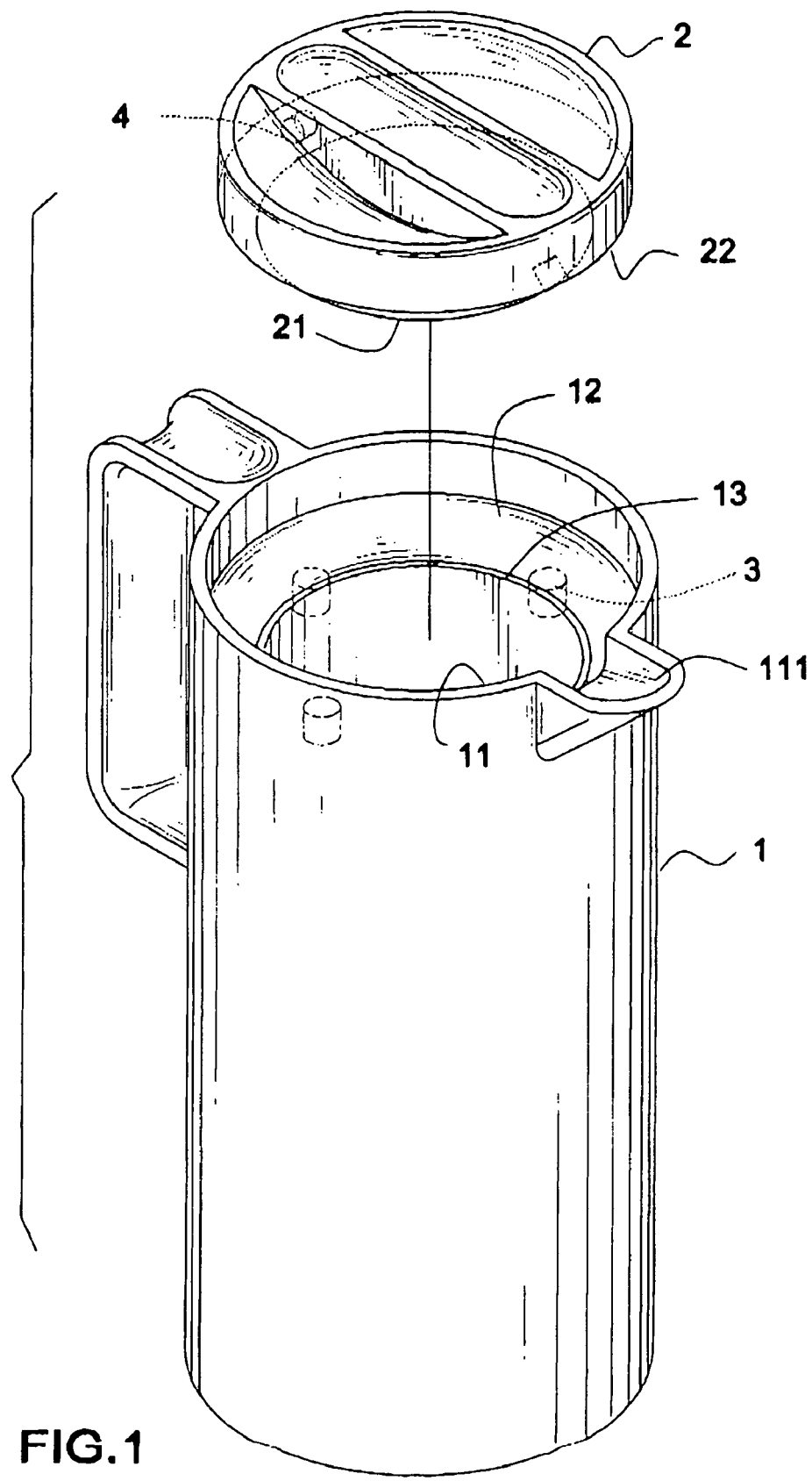
FIG. 1 is an exploded perspective view of the pot of the present invention.

With reference to FIG. 1, the pot in accordance with the present invention includes a hollow cylindrical body (1) with an open end (11) and a lid (2) to cover the open end (11).

The cylindrical body (1) has an outlet (111) defined in a peripheral edge defining the open end (11) to communicate with the inside of the cylindrical body (1). A slope (12) is formed around the peripheral edge of the open end (11). A first flange (13) is formed at a joint between the slope (12) and an inner face of the cylindrical body (1). Multiple first magnets (3) are embedded in the inner face of the cylindrical body (1) and close to the first flange (13).

The lid (2) has a conical bottom (21) formed on a bottom face of the lid (2) to correspond to the slope (12) of the cylindrical body (1) and a second flange (22) corresponding to the first flange (13). Multiple second magnets (4) are embedded in the bottom face of the lid (2) and close to the second flange (22).

Figure 2:
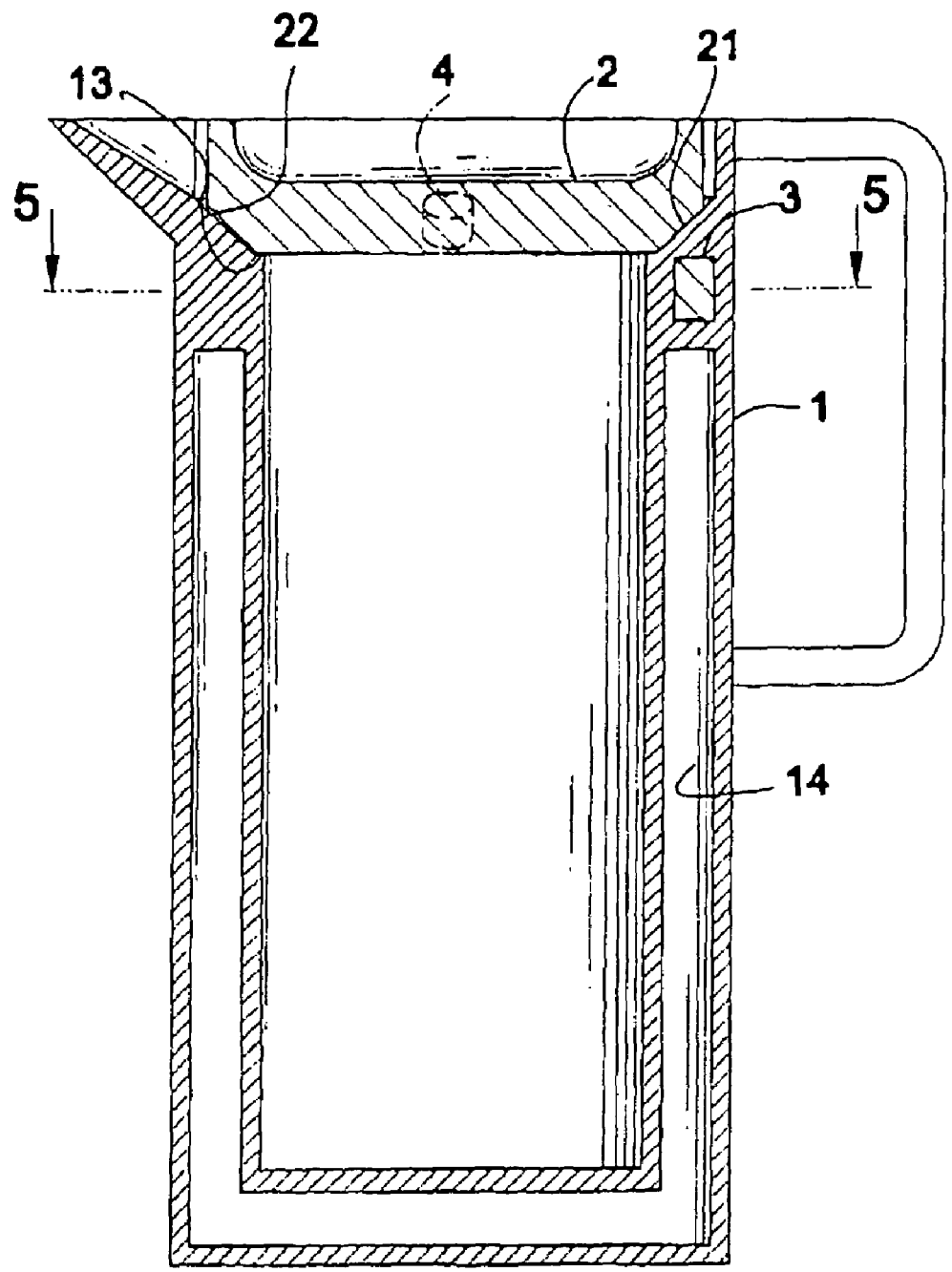
FIG. 2 is a cross sectional view of the assembled pot of the present invention.

With reference to FIG. 2, it is noted that when the lid (2) is mounted on the cylindrical body (1), the conical bottom (21) mates with the slope (12). Furthermore, the cylindrical body (1) may have an inner chamber (14) defined in the side face of the cylindrical body (1) so as to enhance the temperature retaining effect of the pot of the present invention.

Figure 3:
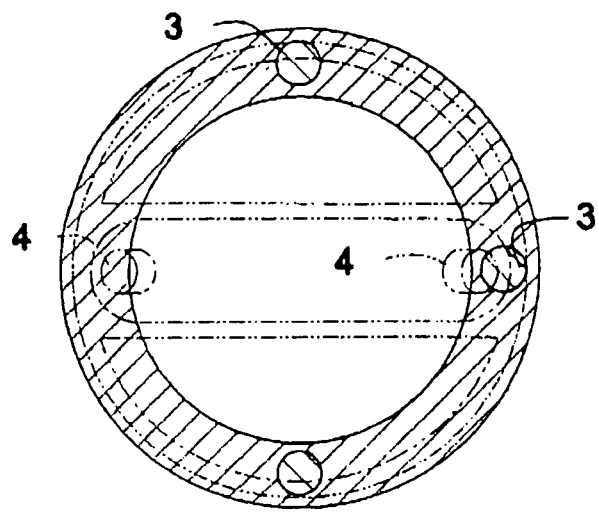
FIG. 3 is a cross sectional view taken along section line 3—3 of FIG. 5 showing that the lid is partially attracted by the body.
Figure 4:
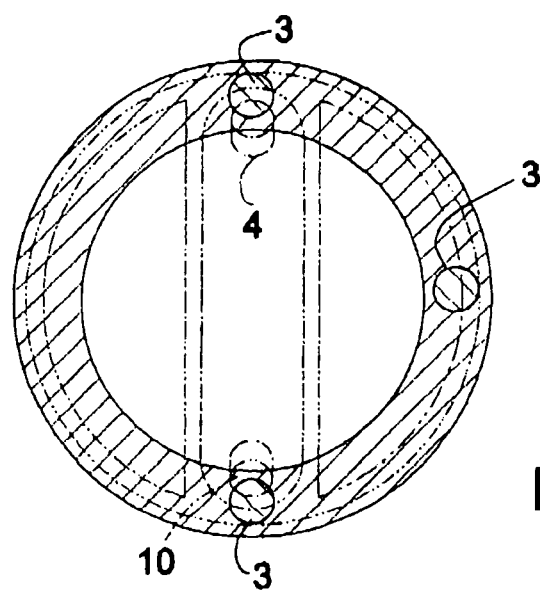
FIG. 4 is a cross sectional view showing that the lid is completely attracted by the body.
Figure 5:
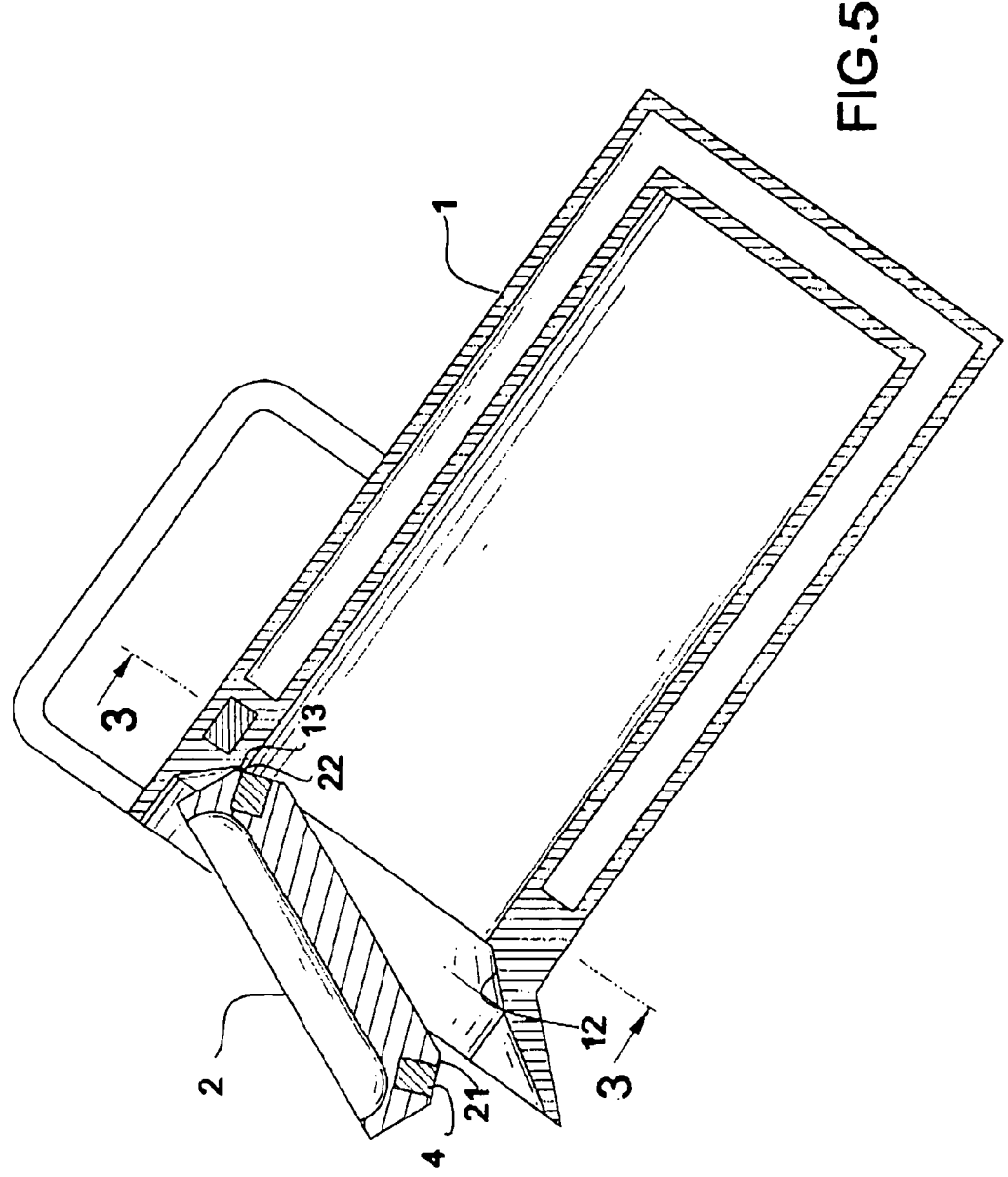
FIG. 5 is a schematic cross sectional view taken along section line 5—5 of FIG. 2 showing that the lid is inclined relative to the body and still kept in engagement with the body.

With reference to FIGS. 3, 4 and 5 and still taking FIG. 1 for reference, it is noted that there are two second magnets (4) diametrically arranged in the lid (2). There are three first magnets (3) in the cylindrical body (1), wherein two of which are diametrically arranged in the inner side face of the cylindrical body (1) and the third one is arranged in the inner side face of the cylindrical body (1) and opposite relative to the outlet (111).

Therefore, when the pot of the present invention is in use and the cylindrical body (1) is inclined relative to the ground, the user is able to rotate the lid (2) relative to the cylindrical body (1) to have only one of the second magnets (4) aligning with the one first magnet (3) which is oppositely located relative to the outlet (111). Accordingly, the other second magnet (4) aligns with the outlet (111). Because only one portion of the lid (2) is attracted to the cylindrical body (1) due to the interactive attraction between the first magnet (3) and the second magnet (4), the lid (2) is still able to be moved to allow the liquid to flow out of the cylindrical body (1) and not fall from the cylindrical body (1) even when the lid (2) is inclined relative to the cylindrical body (1). Under such a condition, the user may pour the liquid out of the cylindrical body (1) and still maintain the lid (2) attached to the cylindrical body (1). Still, when the lid (2) is inclined relative to the cylindrical body (1), the engagement between the first flange (13) and the second flange (22) further enhances the connection between the lid (2) and the cylindrical body (1).

However, when the user wants to retain the liquid inside the cylindrical body (1) when the lid (2) is inclined relative to the cylindrical body (1), the user may rotate the lid (2) relative to the cylindrical body (1) to have both the second magnets (4) aligned with the two diametrically arranged first magnets (3) such that because the lid (2) is completely attracted to the cylindrical body (1), movement of the lid (2) relative to the cylindrical body (1) is resisted by the first magnets (3) and second magnets (4). Therefore, because of the alignment between the conical bottom (21) of the lid (2) and the slope (12) of the cylindrical body (1), the liquid inside the cylindrical body (1) is retained even when the lid (2) is inclined relative to the cylindrical body (1).

Figure 6:
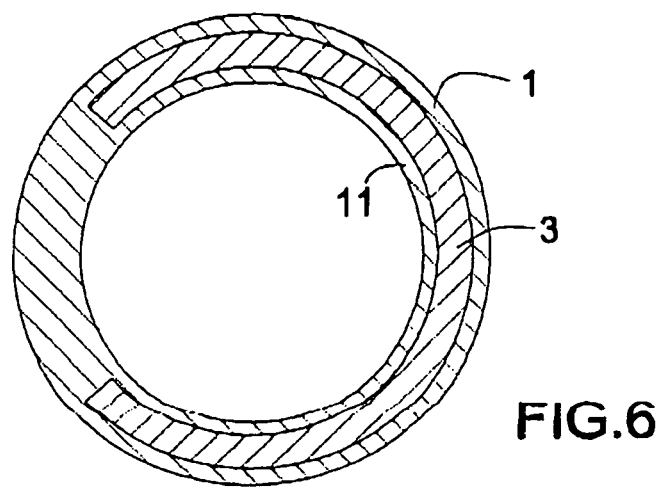
FIG. 6 is a cross sectional view showing different arrangement of the first magnet in the body.

With reference to FIG. 6, it is noted that there is only one first magnet (3) annularly arranged on the peripheral edge of the open end (11) except the outlet (111), which can still accomplish the requirements.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the fill extent indicated by the broad general meaning of the terms in which the appended claims are expressed.

What is claimed is:

1. In a pot having a hollow body with an open end and an outlet defined in a peripheral edge defining the open end to communicate with the open end and a lid detachably mounted on the hollow body to cover the open end, wherein the improvements comprise:
   at least one first magnet adapted to be annularly embedded in the peripheral edge defining the open end of the hollow body; and
   two second magnets diametrically embedded in a bottom face of the lid, wherein when only one second magnet is attracted by the at least one first magnet, the lid is able to move relative to the hollow body to allow the lid to be inclined relative to the hollow body and when both second magnets are attracted by the at least one first magnet, the lid is retained relative to the hollow body so as to close the communication between the open end and the outlet.

2. The pot as claimed in claim 1, wherein the hollow body has a slope formed on the peripheral edge of the hollow body and the lid has a conical bottom formed on a bottom face of the lid to correspond to the slope so that when the lid is retained relative to the hollow body, the communication between the open end and the outlet is closed.

3. The pot as claimed in claim 2, wherein there are three first magnets, two of the first magnets are diametrically arranged in the peripheral edge of the open end and the third first magnet is oppositely arranged relative to the outlet.

4. The pot as claimed in claim 2, wherein a first flange is formed at a joint between the slope and an inner face of the hollow body and a second flange is formed at the bottom face of the lid to correspond to the first flange such that when the lid is inclined relative to the hollow body, engagement between the first flange and the second flange enhances a connection between the lid and the hollow body.

5. The pot as claimed in claim 4, wherein there are three first magnets, two of the first magnets are diametrically arranged in the peripheral edge of the open end and the third first magnet is oppositely arranged relative to the outlet.

6. The pot as claimed in claim 1, wherein a first flange is formed at a joint between the slope and an inner face of the hollow body and a second flange is formed at the bottom face of the lid to correspond to the first flange such that when the lid is inclined relative to the hollow body, engagement between the first flange and the second flange enhances a connection between the lid and the hollow body.

7. The pot as claimed in claim 6, wherein there are three first magnets, two of the first magnets are diametrically arranged in the peripheral edge of the open end and the third first magnet is oppositely arranged relative to the outlet.

8. The pot as claimed in claim 1, wherein there are three first magnets, two of the first magnets are diametrically arranged in the peripheral edge of the open end and the third first magnet is oppositely arranged relative to the outlet.

9. The pot as claimed in claim 1, wherein the first magnet is annularly arranged in the peripheral edge except where the outlet is defined.

* * * * *